United States Patent [19]

Beck et al.

[11] 4,088,789
[45] May 9, 1978

[54] ENSILAGING AGENT FOR FODDER PLANTS

[75] Inventors: Theodor Beck, Munich; Friedrich Gross, Brub near Munich, both of Germany

[73] Assignee: Plate Bonn Gesellshaft mit Beschrankter Haftung, Bonn, Germany

[21] Appl. No.: 676,865

[22] Filed: Apr. 14, 1976

Related U.S. Application Data

[63] Continuation-in-part of Ser. No. 486,166, Jul. 5, 1974, abandoned.

[30] Foreign Application Priority Data

Jul. 11, 1973  Germany .............................. 2335253

[51] Int. Cl.² .............................................. A23K 3/03
[52] U.S. Cl. ...................................... 426/9; 426/321; 426/61; 426/54; 424/127
[58] Field of Search ....................... 426/9, 49, 54, 321, 426/335

[56] References Cited

U.S. PATENT DOCUMENTS 3,961,079   6/1976   Hellberg ................................. 426/54

FOREIGN PATENT DOCUMENTS 120,980   8/1971   Denmark ............................... 426/54

OTHER PUBLICATIONS

Podkowka, W., "Use of Sodium Benzoate in Ensilaging Green Feeds", Chem. Abstr., vol. 76, 1972, p. 277 71145f.

Kolesnikov, "Preservation of Green Fodder by Benzoic Acid", Chem. Abstr., vol. 78, 1973, p. 389 56702h.

*Primary Examiner*—Raymond N. Jones
*Assistant Examiner*—C. A. Fan
*Attorney, Agent, or Firm*—Donald D. Jeffery

[57] ABSTRACT

Disclosed is an ensilaging agent for fodder comprising from about 0.75 to 1 part by weight of an alkali metal salt of nitrous acid, from about 0.3 to 0.8 parts by weight of a compound yielding an aliphatic aldehyde having 1 to 6 carbon atoms during the ensilaging process, and from about 0.15 to 1.5 parts by weight of benzoic acid or a salt thereof for each 1 part by weight of combined nitrous acid salt and aldehyde yielding compound. An improved method is also disclosed wherein the disclosed ensilaging agent is added to fodder in an amount of from about 0.05% to about 0.5% of the fodder weight and comprises from about 0.02 to 0.2% by weight of an alkali metal salt of nitrous acid, from about 0.015 to 0.1% by weight of a compound yielding an aliphatic aldehyde having 1 to 6 carbon atoms during the ensilaging process and from about 0.01 to 0.2% by weight of benzoic acid or a salt thereof for each 1 part by weight of combined nitrous acid salt and aldehyde yielding compound.

10 Claims, No Drawings

ENSILAGING AGENT FOR FODDER PLANTS

BACKGROUND OF THE INVENTION

This application is a Continuation-In-Part application of co-pending Application Ser. No. 486,166 filed July 5, 1974 now abandoned.

The present invention relates to ensilaging agents for fodder, as well as to the employment of such ensilaging agents for ensilaging fodder plants which cannot be ensilaged without difficulties.

It is known from experience that in order to make ensilage from fodder plants which cannot be ensilaged without difficulties, especially moist green fodders which are rich in protein, the employment of a controlling additive is necessary which prevents improper fermentation. The preserved green fodder produced by means of a natural or controlled lactic acid fermentation with the employment of dispersible or liquid auxiliary materials is called "silage".

It is known that the improved effect of ensilaging agents results from a promotion of natural acidification and a thereby increased pH lowering in the fodder. In accordance with the prior art and with known methods, an intensified acidification can be achieved by the addition of:

a. sugar or sugar-containing additions or enzyme preparations which serve to supply additional sugar;
b. lactic acid bacteria cultures;
c. inorganic or organic acids;
d. inhibitors which selectively affect the fermentation-damaging flora.

Ensilaging experiments of our own, continued for several years with a multiplicity of fodder plant varieties, have led to the result that, for fodder types which cannot be ensilaged without difficulties, none of the methods indicated assures in practice a sufficient safety of the ensilaging success, or to the result that the financial expenses for the ensilaging additions are economically unbearable. The disadvantages of the known methods are based either on the difficulty of the technical application (inoculation: fine distribution of the bacteria suspension; acid addition: corrosion-proof spraying devices), or the selective inhibitors employed are not adapted to the biological process in the individual ensilaging stages.

Ensilaging agents with a content of alkali salts of nitrous acid and hexamethylene tetramine are known from the German Offenlegungsschriften Nos. 1,692,440 and 2,158,946. As is obvious from the subsequent comparative tests, however, optimum results cannot yet be achieved by means of these ensilaging agents.

SUMMARY OF THE INVENTION

An object of the invention resides in developing a dispersible control additive, capable of fine dosing, and an ensilaging agent which safely prevents improper fermentation on the basis of the combination of inhibitors which are very compatible with lactic acid bacteria, but are highly selective for fermentation-hostile microbe groups occurring at the beginning of the fermentation and in the maturing phase.

There is provided, in accordance with the present invention, an ensilaging agent for fodder comprising from about 0.75 to 1 part by weight of an alkali metal salt of nitrous acid (Compound A) and, optionally, the usual adsorbing or carrier materials, from about 0.3 to 0.8 parts by weight of a compound which yields an aliphatic aldehyde having 1 to 6 carbon atoms, during the ensilaging process of fodder and from about 0.15 to 1.5 parts by weight of benzoic acid or a salt thereof for each 1 part by weight of combined nitrous acid salt and aldehyde-yielding compound.

In a particularly preferred composition, the ensilaging agent of the invention contains as component B, compounds that yield aliphatic aldehydes having 1 to 2 carbon atoms, especially formaldehyde during the ensilaging process of fodder. Examples of such compounds are hexamethylene tetramine and paraformaldehyde. These compositions are preferred especially for the reason that they are readily available and very economical.

Compounds yielding aldehydes during the ensilaging process of fodder are employed, according to the invention, for the reason that the low aliphatic aldehydes themselves are very volatile, however, the ensilaging agent must be a solid material in the form of a powder or granulated material so that it can be readily added, in small amounts, to the material to be ensilaged. Therefore, it is advantageous to employ at room temperatures as component B until they are actually used for the ensilaging of fodder solid materials which remain stable, even after the ensilaging agents have been in storage for several months.

As component A, sodium or potassium salts are preferably employed, essentially for economic reasons. Sodium benzoate is preferably employed as component C, likewise for economic reasons and because it is very soluble in water and therefore is readily soluble during the ensilaging process.

Furthermore, the present invention aims at a method for ensilaging fodder which is characterized in that an ensilaging agent, according to above definition, in a weight ratio of 0.05 to 0.5% based upon the active agents and the green fodder weight, is added to the material to be ensilaged. According to the method, the ensilaging agent to be added consists preferably of a mixture which contains as active agents from about 0.02 to 0.2% by weight of one or more alkali metal salts of nitrous acid, from about 0.015 to 0.1% by weight of component B, preferably hexamethylene tetramine or paraformaldehyde, and from about 0.01 to 0.2% by weight of component C, preferably sodium benzoate, all weight percentages with relation to the material to be ensilaged.

Other objects, features and advantages of the invention will become apparent from the detailed description of the invention which follows.

DETAILED DESCRIPTION OF THE INVENTION

Whereas alkali metal salts of nitrous acid, on the one hand, or hexamethylene tetramine, or another compound that yields an aldehyde, on the other hand, when employed alone, result in an unsuccessful ensilaging process, it has been surprisingly discovered that a combination of these effective substances results in ensilages with excellent qualities, even when applied to fodder plants which cannot be ensilaged without difficulties. An even more favorable result is achieved when benzoic acid or salt thereof, especially sodium benzoate, of the aforementioned concentration is added, since such compounds, in contrast to nitrate and hexamethylene tetramine or another compound that yields an aldehyde, is not decomposed during the fermentation process and prevents secondary fermentations, especially in materials high in carboyhydrates.

In particular, with employment of an ensilaging agent according to the invention, the result is achieved that undesirable microorganisms are selectively inhibited by the beginning of the fermentation and in the maturing phase. This is shown in the subsequent Table 1:

TABLE 1

Influence of various ensilaging agents upon the losses caused by dry substance losses during fermentation. (DS = dry substance)

| Addition | lucerne (alfalfa) 11.8% DS DS losses | Pasturegrass 18.1%DS DS losses |
|---|---|---|
| Without addition | above 25.0% | above 25.0 |
| NaNO₂ or KNO₂ 0.067% 0.067% | above 25.0% | 24.3% |
| Hexamethylene or paraformaldehyde 0.03% 0.03% | 17.8% | above 25.0% |
| Sodium benzoate 0.1% | 22.8% | above 25.0% |
| NaNO₂ or KNO₂ 0.04% 0.04% | 19.5% | 13.4% |
| sodium benzoate 0.06% | 19.5% | 13.4% |
| NaNO₂ or KNO₂ 0.06% 0.06% | 5.8% | 4.6% |
| hexameth. or paraformaldehyde 0.04% 0.04% | 5.8% | 4.6% |
| NaNO₂ or KNO₂ 0.04% 0.04% | 5.0% | 3.5% |
| hexamethy. or paraformaldehyde 0.03% 0.03% | 5.0% | 3.5% |
| sodium benzoate 0.03% | 5.0% | 3.5% |

The ensilaging success and the economy depends primarily on the amount of the losses. These losses can, therefore, be utilized as the best criterion for the improvement of the fermentation.

The table shows that by means of the ensilaging agent according to the invention, a surprisingly improved effect is obtained in comparison with the prior art as well as with the exclusive employment, in each case, of sodium nitrite and hexamethylene tetramine, or another aldehyde compound, as well as sodium benzoate.

. It has been found that the selectivity of the active substances according to the invention as inhibitors for the different groups of organisms is particularly efficient in a relatively narrow range of concentration. For nitrites this optimum range for the elimination of all fermentation-resistant microbes which are active at the beginning of the fermentation (bacteria, aerogenes, yeasts, minute fungi causing mole — white film, mildew), without substantially inhibiting the lactic acid bacteria, ranges between about 0.02 and 0.2. The preferred minimum amounts of metal salts of nitrous acid are preferably 0.03%, more preferably 0.04% and most preferably 0.06%. At the same time the maximum amounts are preferably 0.1%, more preferably 0.08% and most preferably 0.07%. The favorable concentration of hexamethylene tetramine or another compound yielding aldehyde, for smothering the lactic acid bacteria (clostridia) occurring in subsequent fermentation periods amounts approximately to 0.015 to 0.1%. The minimum amount of a compound yielding an aliphatic aldehyde is preferably 0.02%, more preferably 0.03% and most preferably about 0.04%, and the maximum amount is preferably 0.08%, more preferably 0.06% and most preferably about 0.04%. An improved effect, especially in plants rich in carbohydrates, is achieved when sodium benzoate is also employed. The effective concentration range of this material prevails at an addition of about 0.01 to 0.2% in each case. The minimum amount of benzoic acid or salt thereof is preferably 0.015%, more preferably 0.02% and most preferably about 0.03%, and the maximum amount is preferably 0.1%, more preferably 0.08% and most preferably about 0.04%. The total weight of said three components to be applied to the silage is preferably at least 0.06%, more preferably 0.07% and most preferably 0.1% and still more preferably 0.13%, and the maximum amount is preferably 0.5%, more preferably 0.25% and most preferably about 0.15%. The various experiments set forth at the end of the present description demonstrate the use of ensilaging compositions containing these various preferred amounts of components, nitrites, aldehyde-yielding compounds and benzoic acid compounds.

One of the active substances is, as already stated, hexamethylene tetramine. It is assumed that the effect of this material results from the fact that during the fermentation period formaldehyde is split off. Therefore, the same effect can in principle also be achieved by means of other efficient substances which yield aldehydes under the conditions of fermentation. For reasons of economy, easy availability and harmlessness, however, hexamethylene tetramine is preferred. With the addition of benzoate, the concentration range of hexamethylene tetramine can be lowered. Furthermore, benzoate offers the advantage that, in contrast to hexamethylene tetramine, which like nitrite is decomposed during the fermentation processes, it is preserved in the ensilage and thus, in particular, offers an efficient protection against secondary fermentation. Of the alkali metal salts of nitrous acid, sodium nitrite is preferred for econoic reasons and because it is extremely readily available. As a matter of principle, however, other alkali metal salts may also be employed. In each case it is also feasible to employ, as components A, B or C, respectively, mixtures of several of the indicated compounds.

Since the effective substances of the invention are added to the fodder materials in extremely small quantities and the effective substances themselves are not very fluid, it is preferred to mix the active substances with an absorbing or carrier substance which has no detrimental influence upon the ensilage. It is therefore preferred to employ as ensilaging agent a mixture which contains the active substances of the invention together with an inert adsorbent or carrier material. These adsorbing or carrier substances which are added to the active substances facilitate the manipulation of the ensilaging agent. With an enlarged volume, it permits uniform distribution in the ensilaging material, especially green material. Also the fluidity of the ensilaging agent is improved. Materials which may serve as carrier or adsorbent substances are, e.g., Thomas phosphate, ground crude phosphate, Rhenania phosphate, ground bone fodder, tricalcium phosphate, kaolin talcum, stearates of alkaline earth metals, common or rock salt.

The combination of the active substances of the invention in its attuned selective inhibiting effect upon microbes over certain partial ranges of the entire ensilaging process, without additional sugar additions, differs basically from all conventional methods because, by this means, the exclusive principle of promotion of acid formation and thus the increased pH lowering for eliminating the harmful flora has been abandoned for the first time. The fermentation-improving effect of the addition of alkali metal salts of nitrous acid at the beginning of the fermentation has been known for some length of time already, but this effect is insufficient, especially in fodder plants which cannot be ensilaged without difficulties, to lower the reaction to such a point that butyric acid bacteria can no longer bring about an anaerobic reversal through acid consumption. To be sure, by supplemental sugar additions, acid formation was increased in certain cases to such a point that stability resulted. The safety to be thus achieved was not sufficient for practical situations. However, hexamethylene tetramine effects in each case, even when acidification is only slight, an elimination of the subsequent acid consumption and thus assures the safety of the ensilaging success. The effectiveness of ensilaging additives upon the pH lowering and butyric acid formation, as well as upon the proteolysis in ensilages is compiled in the subsequent Table 2.

TABLE 2

Efficiency of the ensilaging agent of the invention (40% $NaNO_2$, or 40% $KNO_2$ + 40% Na-benzoate + 20% hexameth., or 20% paraformaldehyde).

| | LA % | AA % | BA % | pH | "FLIEG" point | DS loss | proteolysis |
|---|---|---|---|---|---|---|---|
| 1. Pasture grass moist | | | | | | | |
| without addition | 0.24 | 0.71 | 0.98 | 5.7 | − 2.4 | 19.3 | 32.3 |
| with 0.2% addition | 1.38 | 0.44 | 0.05 | 4.8 | 78.4 | 3.8 | 16.2 |
| 2. Pasture grass slightly withered | | | | | | | |
| without addition | 1.14 | 0.27 | 1.15 | 5.1 | 19.2 | 12.1 | 15.1 |
| with 0.2% addition | 1.31 | 0.39 | 0.02 | 4.9 | 85.2 | 3.7 | 10.1 |

LA = lactic acid
AA — acetic acid
BA = butyric acid
DS — dry substance

These facts can also be deduced from the results of corresponding ensilaging tests. The advantages obtained by the invention consist in that an ensilaging agent is employed which, when small amounts (concentration of the efficient components 0.1 to 0.2%) are used, assures a sufficient safety of the ensilaging result, even with fodder plants which cannot be ensilaged without difficulties, and the sugar content of which is not sufficient for an acid production in the amount necessary for stability. The favorable effect upon silages rich in carbohydrates has already been pointed out. Objections with respect to the nutrition-physiological effect of the present inhibitors, when the ensilage treated according to the invention is used, as fodder do not exist since nitrites are decomposed, already within the first fermentation days, completely to ammonia and nitrous oxides, and the hexamethylene tetramine is likewise decomposed completely, although only during the maturing phase. The sodium benzoate remaining in the ensilage has no negative influence since it is not toxic and is, as known, employed and permitted in foodstuff preservation. Feeding tests with correspondingly treated ensilage did not furnish any indication of a disturbance in fodder consumption and health of the animals.

All percentages given above refer to sodium nitrite, hexamethylene tetramine and sodium benzoate, in case other compounds are used, the corresponding equivalent amounts shall be used.

EXAMPLE 1

For the purpose of ensilaging 30 cubic meters, corresponding to about 15,000 kg. of alfalfa, a total amount of 0.25% = 37.5 kg. of a mixture, consisting of 30% sodium nitrite, 15% hexamethylene tetramine, 10% sodium benzoate, and 45% of an adsorbent or carrier substance, either common salt or ground natural phosphate, is added, by hand or continuously by way of a dosing apparatus.

EXAMPLE 2

For the purpose of ensilaging 200 cubic meters of grass, corresponding to 120,000 kg., 0.25% = 300 kg. of a mixture of 30% sodium nitrite, 15% hexamethylene tetramine, 10% sodium benzoate, and 45% of an adsorbent or carrier substance (e.g., common salt or ground crude phosphate) is added continuously by means of a dosing apparatus during the harvest with a loading wagon.

EXAMPLE 3

For the purpose of ensilaging 100 cubic meters of silo corn, corresponding to 60,000 kg., 0.2% = 120 kg. of a mixture of 30% sodium nitrite, 15% hexamethylene tetramine, 10% sodium benzoate, and 45% of an adsorbent or carrier substance (e.g., common salt or ground crude phosphate) is added continuously by means of a dosing apparatus during the harvest, by means of a field chopping machine or during the filling of the silo with conveyor belt or blower.

EXAMPLE 4

For the purpose of ensilaging 500 cubic meters of silo corn, corresponding to about 300,000 kg., 0.1% = 300 kg. of a mixture of 30% sodium nitrite, 15% hexamethylene tetramine, 10% sodium benzoate, and 45% of an adsorbent or carrier mixture (e.g., rock salt or Rhenania phosphate) is added in doses in powder form by means of a dosing apparatus during filling of the silo by means of conveyor belt or blower.

EXAMPLE 5

For the purpose of ensilaging 20 cubic meters of alfalfa, corresponding to about 10,000 kg., 0.285% − 28.5 kg. of a mixture of 30% sodium nitrite, 15% hexamethylene tetramine, 10% sodium benzoate, and 45% adsorbent or carrier mixture (e.g., bone fodder meal, tricalcium phosphate, kaolin and mineral salt) is added to the cut material by manual mechanical interspersing, when the green material is placed in the silo or during the harvest.

EXAMPLE 6

For the purpose of preserving 200 cubic meters of Landsberg mixture, corresponding to about 100,000 kg., 0.285% = 285 kg. of a mixture of 30% sodium nitrite, 15% hexamethylene tetramine, 10% sodium benzoate, and 45% adsorbent or carrier materials (e.g., tricalcium phosphate, talcum, fine salt) is added to the harvest material by means of a dosing apparatus while the harvest is being cut, and then the total mixture was introduced into the silo bin.

EXAMPLE 7

For the purpose of ensilaging 500 cubic meters of silo corn, corresponding to about 30,000 kg., 0.1% = 300 kg. of a mixture of 30% potassium nitrite, 15% hexamethylene tetramine, 10% sodium benzoate, and 45% of an adsorbent or carrier mixture (e.g., rock salt or Rhenania phosphate) is added in doses in powder form when the silo is being filled by means of a conveyor belt or blower.

EXAMPLE 8

For the purpose of ensilaging 200 cubic meters of grass, corresponding to 120,000 kg., 0.25% = 300 kg. of a mixture of 30% sodium nitrite, 15% paraformaldehyde, 10% sodium benzoate, and 45% of an adsorbent or carrier material (e.g., common salt or ground crude phosphate) is continuously added by means of a dosing apparatus when the grass is being harvested with a loading wagon.

EXAMPLE 9

For the purpose of ensilaging 20 cubic meters of alfalfa, corresponding to about 10,000 kg., 0.285% = 28.5 kg. of a mixture of 30% potassium nitrite, 15% paraformaldehyde, 10% sodium benzoate, and 45% adsorbent or carrier mixture (e.g., bone fodder meal, tricalcium phosphate, kaolin, and rock salt) is added to the cut material by manual or mechanical interspersing when the green material is being placed in the silo or when it is being harvested.

EXAMPLE 10

For the purpose of ensilaging 100 cubic meters, corresponding to about 60,000 kg. red clover, a total amount of 0.25% = 150 kg. of a mixture, consisting of 30% sodium nitrite, 20% hexamethylene tetramine, 10% sodium benzoate and 45% of ground crude phosphate, is added by hand or continuously by way of a dosing apparatus.

EXAMPLE 11

For the purpose of ensilaging 150 cubic meters, corresponding to about 90,000 kg. grass, a total amount of 0.2% = 180 kg. of a mixture, consisting of 35% sodium nitrite, 20% hexamethylene tetramine, 15% sodium benxoate and 30% common salt, is added continuously by means of a dosing apparatus during the harvest with a loading wagon.

EXAMPLE 12

For the purpose of ensilaging 200 cubic meters, corresponding to about 120,000 kg. grass, a total amount of 0.3% = 360 kg. of a mixture, consisting of 40% sodium nitrite, 20% hexamethylene tetramine, 10% sodium benzoate and 30% ground crude phosphate as carrier material is added in doses in powder form when the silo is being filled by means of a conveyor belt.

EXAMPLE 13

For the purpose of ensilaging 400 cubic meters, corresponding to about 240,000 kg., a total amount of 0.2% = 480 kg. of a mixture, consisting of 30% sodium nitrite, 30% hexamethylene tetramine, 20% sodium benzoate and 20% common salt as carrier material is added in doses in powder form when the silo is being filled by means of a blower.

EXAMPLE 14

For the purpose of ensilaging 100 cubic meters of partly withered grass, corresponding to 90,000 kg., 0.2% = 180 kg. of a mixture of 50% sodium nitrite, 30% hexamethylene tetramine and 20% sodium benzoate is continuously added by means of a dosing apparatus when the grass is being harvested with a loading wagon.

TABLE 3

Amounts in % by weight of active ingredients based on weight of fodder.

| Example | Na-Nitrite | HMT | Na-Benzoate | Total |
|---|---|---|---|---|
| 1 | 0.075 | 0.0375 | 0.025 | 0.1375 |
| 2 | 0.075 | 0.0375 | 0.025 | 0.1375 |
| 3 | 0.06 | 0.03 | 0.02 | 0.11 |
| 4 | 0.03 | 0.015 | 0.01 | 0.055 |
| 5 | 0.086 | 0.043 | 0.029 | 0.158 |
| 6 | 0.086 | 0.043 | 0.029 | 0.158 |
| 7 | 0.03 | 0.015 | 0.01 | 0.055 |
| 8 | 0.075 | 0.0375 | 0.025 | 0.1375 |
| 9 | 0.086 | 0.043 | 0.029 | 0.158 |
| 10 | 0.075 | 0.05 | 0.025 | 0.15 |
| 11 | 0.07 | 0.04 | 0.03 | 0.14 |
| 12 | 0.12 | 0.06 | 0.03 | 0.21 |
| 13 | 0.06 | 0.06 | 0.04 | 0.16 |
| 14 | 0.1 | 0.06 | 0.04 | 0.2 |
| Table 1 | 0.04 | 0.03 | 0.03 | 0.1 |
| Table 2 | 0.08 | 0.04 | 0.08 | 0.2 |

We claim:

1. An ensilaging agent for fodder comprising from about 0.75 to 1 part by weight of an alkali metal salt of nitrous acid, from about 0.3 to 0.8 parts by weight of a compound yielding an aliphatic aldehyde having 1 to 6 carbon atoms, and from about 0.15 to 1.5 parts by weight benzoic acid or a salt thereof for each 1 part by weight of combined nitrous acid salt and aldehyde-yielding compound.

2. The ensilaging agent as defined by claim 1, wherein said aldehyde-yielding compound yields an aliphatic aldehyde having 1 to 2 carbon atoms.

3. The ensilaging agent as defined by claim 1, wherein said aldehyde-yielding compound yields formaldehyde.

4. The ensilaging agent as defined by claim 1, wherein said aldehyde-yielding compound is hexamethylene tetramine or paraformaldehyde.

5. The ensilaging agent as defined by claim 1, wherein said benzoic acid salt is sodium benzoate.

6. The ensilaging agent as defined by claim 1, wherein, in combination with fodder, said alkali metal salt is present in an amount of from 0.02 to 0.2% based on the weight of said fodder, said aldehyde-yielding compound is present in an amount of from 0.015 to 0.1% based on the weight of said fodder, and said benzoic acid or salt is present in an amount of from 0.01 to 0.2% based on the weight of said fodder, the total amount of ensilaging agent comprising from 0.05 to 0.5% of said fodder.

7. The ensilaging agent as defined by claim 1, wherein, in combination with fodder, said alkali metal salt is present in an amount of from 0.03 to 0.1% based on the weight of said fodder, said aldehyde-yielding compound is present in an amount of from 0.02 to 0.08% based on the weight of said fodder, and said benzoic acid or salt is present in an amount of from 0.015 to 0.1% based on the weight of said fodder, the total amount of ensilaging agent comprising from 0.06 to 0.5% of said fodder.

8. The ensilaging agent as defined by claim 1, wherein, in combination with fodder, said alkali metal salt is present in an amount of from 0.04 to 0.08% based on the weight of said fodder, said aldehyde-yielding compound is present in an amount of from 0.03 to 0.06% based on the weight of said fodder, and said benzoic acid or salt is present in an amount of from 0.02 to 0.08% based on the weight of said fodder, the total amount of ensilaging agent comprising from 0.07 to 0.25% of said fodder.

9. The ensilaging agent as defined by claim 1, wherein, in combination with fodder, said alkali metal salt is present in an amount of from 0.04 to 0.07% based on the weight of said fodder, said aldehyde-yielding compound is present in an amount of 0.03 to 0.04% based on the weight of said fodder, and said benzoic acid or salt is present in an amount of from 0.03 to 0.04% based on the weight of said fodder, the total amount of ensilaging agent comprising from 0.1 to 0.15% of said fodder.

10. A method for ensilaging fodder, comprising adding to the material to be ensilaged from about 0.05 to 0.5% based upon the green fodder weight of the ensilaging agent defined by claim 1.